(12) United States Patent
Griffith et al.

(10) Patent No.: US 11,745,807 B2
(45) Date of Patent: *Sep. 5, 2023

(54) VEHICLE SILL FLAP

(71) Applicant: Rivian IP Holdings, LLC, Plymouth, MI (US)

(72) Inventors: Eric Griffith, Farmington Hills, MI (US); Brian Gase, Ypsilanti, MI (US); Kyle Mulligan, Livonia, MI (US); William Kirk Robinson, Ann Arbor, MI (US); Chayan Mishra, Farmington Hills, MI (US)

(73) Assignee: Rivian IP Holdings, LLC, Plymouth, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/984,573

(22) Filed: Nov. 10, 2022

(65) Prior Publication Data

US 2023/0074813 A1 Mar. 9, 2023

Related U.S. Application Data

(63) Continuation of application No. 17/095,439, filed on Nov. 11, 2020, now Pat. No. 11,498,626.

(51) Int. Cl.
*B62D 33/03* (2006.01)
*B60R 13/01* (2006.01)
*B62D 33/027* (2006.01)

(52) U.S. Cl.
CPC ......... *B62D 33/0273* (2013.01); *B62D 33/03* (2013.01); *B60R 13/01* (2013.01)

(58) Field of Classification Search
CPC ..... B60R 13/01; B60R 13/011; B60R 13/013; B60R 13/043; B60R 13/04; B60R 13/06; B60R 2013/0281; B60J 5/0493; B62D 25/025; B62D 33/027; B62D 33/0273; B62D 33/03

See application file for complete search history.

(56) References Cited

U.S. PATENT DOCUMENTS

| | | |
|---|---|---|
| 4,047,749 A | 9/1977 | Lambitz et al. |
| 4,353,857 A | 10/1982 | Ray et al. |
| 4,693,507 A | 9/1987 | Dresen et al. |
| 4,944,612 A | 7/1990 | Abstetar et al. |
| 5,518,158 A | 5/1996 | Matlack |
| 5,660,427 A | 8/1997 | Freeman et al. |
| 5,971,464 A | 10/1999 | Davis et al. |
| 6,183,035 B1 | 2/2001 | Rusu et al. |

(Continued)

*Primary Examiner* — Gregory A Blankenship
(74) *Attorney, Agent, or Firm* — HALEY GUILIANO LLP

(57) ABSTRACT

Vehicle tailgate assembly that includes a sill flap and tailgate, where the sill flap has rollers that contact the tailgate while the sill flap and tailgate are opened or closed. The sill flap thus maintains rolling contact with the tailgate during opening and closing operations. In embodiments of the disclosure, the tailgate opens to leave a gap between the edge of the vehicle bed and the edge of the tailgate, and the sill flap is pivoted into this gap. While being pivoted into this open position, the sill flap rollers rotatably contact the tailgate, so that the sill flap maintains rolling contact with the tailgate rather than frictional contact therewith. This prevents damage to the sill flap and tailgate when opened and closed.

20 Claims, 10 Drawing Sheets

(56) References Cited

U.S. PATENT DOCUMENTS

| | | | |
|---|---|---|---|
| 6,264,268 B1 * | 7/2001 | Goodger | B60R 13/04 296/199 |
| 6,293,602 B1 | 9/2001 | Presley | |
| 6,302,465 B1 * | 10/2001 | Faber | B60R 13/01 296/50 |
| 6,439,649 B1 | 8/2002 | Lorenzo et al. | |
| 6,796,600 B1 | 9/2004 | Ferer et al. | |
| 6,814,397 B2 | 11/2004 | Henderson et al. | |
| 6,880,875 B2 | 4/2005 | McClure et al. | |
| 6,883,851 B2 | 4/2005 | McClure et al. | |
| 7,438,350 B1 | 10/2008 | Peterson et al. | |
| 7,530,629 B2 | 5/2009 | King et al. | |
| 8,186,747 B2 | 5/2012 | Bloodworth et al. | |
| 9,862,430 B1 * | 1/2018 | Stojkovic | B62D 33/0273 |
| 11,220,301 B2 | 1/2022 | Robinson et al. | |
| 11,498,626 B2 * | 11/2022 | Griffith | B62D 43/10 |
| 11,584,453 B2 * | 2/2023 | Knauer | B62D 35/008 |
| 2002/0074818 A1 | 6/2002 | Presley | |
| 2002/0117873 A1 | 8/2002 | Lorenzo et al. | |
| 2004/0262950 A1 | 12/2004 | Bhat et al. | |
| 2005/0057073 A1 | 3/2005 | Hunt | |
| 2006/0125267 A1 | 6/2006 | Stevenson et al. | |
| 2007/0090662 A1 | 4/2007 | Katterloher et al. | |
| 2008/0315608 A1 | 12/2008 | Heller | |
| 2009/0102216 A1 | 4/2009 | Hanzel | |
| 2009/0102219 A1 | 4/2009 | Schrader | |
| 2011/0031778 A1 | 2/2011 | Edwards et al. | |
| 2011/0062742 A1 * | 3/2011 | Alford | B60R 7/02 296/97.23 |
| 2012/0161470 A1 | 6/2012 | Castillo | |
| 2012/0223541 A1 | 9/2012 | Gianino | |
| 2013/0341949 A1 | 12/2013 | Bernthisel | |
| 2015/0344082 A1 | 12/2015 | Keklak | |
| 2015/0375801 A1 | 12/2015 | Barthelemy et al. | |
| 2016/0009212 A1 * | 1/2016 | Lindgren | B60P 1/003 414/498 |
| 2018/0009303 A1 * | 1/2018 | Romero Regalado | B60R 16/03 |
| 2018/0099589 A1 * | 4/2018 | Murray | B60R 11/00 |
| 2018/0118280 A1 | 5/2018 | Marchlewski et al. | |
| 2018/0170452 A1 | 6/2018 | Reiners et al. | |
| 2018/0273114 A1 | 9/2018 | Sanai et al. | |
| 2019/0241219 A1 * | 8/2019 | Smith | B62D 33/03 |
| 2019/0322225 A1 * | 10/2019 | Smith | B62D 33/0273 |
| 2019/0366947 A1 * | 12/2019 | Hahn | B60R 13/04 |
| 2020/0198545 A1 * | 6/2020 | Townson | B60R 7/02 |
| 2020/0239085 A1 * | 7/2020 | Watson | B62D 33/0273 |
| 2021/0039565 A1 * | 2/2021 | Deshpande | B60R 13/01 |
| 2021/0039722 A1 | 2/2021 | Williamson et al. | |
| 2021/0078647 A1 * | 3/2021 | Dunford | B62D 33/0273 |
| 2021/0086680 A1 | 3/2021 | Kyle | |
| 2021/0179181 A1 * | 6/2021 | Choi | B60R 3/02 |
| 2021/0290525 A1 | 9/2021 | Ramani et al. | |
| 2022/0009417 A1 * | 1/2022 | Kim | B60R 3/02 |
| 2022/0063736 A1 | 3/2022 | Williams | |
| 2022/0144351 A1 | 5/2022 | Griffith et al. | |

* cited by examiner

VEHICLE SILL FLAP

CROSS-REFERENCE TO RELATED APPLICATION

This application is a continuation of U.S. patent application Ser. No. 17/095,439, filed Nov. 11, 2010, which is hereby incorporated by reference herein in its entirety.

INTRODUCTION

The present disclosure is directed to vehicles. More specifically, the present disclosure is directed to vehicle tailgate assemblies.

SUMMARY

Vehicles equipped with cargo beds are useful in situations requiring significant hauling capacity. Cargo beds are commonly designed as large, flat beds enclosed by side walls and a rear tailgate that may open to allow easier loading of contents, and close to help secure the contents within the bed during vehicle operation. Various tailgate designs exist. For example, some tailgates are designed to pivot about an axis at or proximate to the lower end of the tailgate panel, resulting in a small gap between the open tailgate and the bed. Conversely, some tailgates are designed with components such as wide-throw or swing-clear hinges that leave an offset or gap between the tailgate panel and the end of the cargo bed, effectively extending the useful length of the cargo bed when the tailgate is open. This often entails an additional tailgate component, such as a sill flap, that covers the gap when the tailgate is open. Such tailgate designs also present challenges, however. For example, space constraints under the vehicle bed, and the sizes and shapes of various vehicle components located there, may dictate unconventional bed shapes that may present difficulties in designing compatible sill flaps.

Accordingly, systems and methods are disclosed herein that provide a vehicle tailgate assembly that allows, for example, the spare tire bin to extend beyond the tailgate sill flap in the closed position, while still allowing the sill flap to open and close properly. In some embodiments, the tailgate assembly includes both a tailgate and a sill flap, where the sill flap has a cutout to accommodate a portion of the spare tire bin when the sill flap is folded down into its open configuration. The tailgate opens away from the truck bed to leave a gap or space between the edge of the bad and the tailgate when opened. The sill flap opens to fit within this space, so that the tailgate and sill flap, when in the open configuration, both lie flat to act as an extension of the vehicle bed.

As the assembly includes both a sill flap and tailgate, the sill flap has a number of rollers located at its upper edge and facing the tailgate, where the rollers contact the tailgate when the tailgate and sill flap are opened. Thus, when opened, the rollers of the sill flap roll along the inner surface of the tailgate as the sill flap and tailgate are pivoted from their upright closed configuration to their horizontal opened configuration. That is, the sill flap lies on the tailgate as the tailgate assembly is opened, with the sill flap rollers preventing sliding contact between the sill flap and tailgate. In particular, the rollers of the sill flap rotatably contact the tailgate to roll as the sill flap and tailgate move relative to each other, preventing scraping or other friction damage between the sill flap and tailgate when the tailgate assembly is opened or closed.

In some embodiments, raised or recessed channels are formed in the tailgate, to accommodate the rollers when they roll along the tailgate. Thus, the sill flap is arranged to place the rollers within or upon the channels, with the rollers rotatably contacting the channels as the tailgate assembly is opened/closed. In some embodiments, the rollers may not contact the channels when the tailgate assembly is fully opened. Instead, a lip of the sill flap may rest on, and be supported by, a portion of the tailgate.

As above, the sill flap may incorporate a cutout to accommodate any portion of the spare tire bin or other element of the vehicle bed. The cutout may be of any shape suitable for accommodating any portion of the vehicle bed. Accordingly, the sill flap may be narrower along its cutout, and wider elsewhere. Such configuration allows a portion of the vehicle bed to extend beyond the sill flap when the sill flap is closed.

The sill flap may be connected to the vehicle bed in any manner. For example, the sill flap may be connected to the vehicle bed via one or more hinges. Hinges may be configured in any manner, such as with a torsion spring whose opposing ends are connected to the sill flap and vehicle bed respectively.

In this manner, embodiments of the disclosure provide a sill flap and tailgate each pivotably connected to a vehicle bed, where the sill flap has one or more rollers facing the tailgate. The rollers thus rotate along the tailgate while the sill flap and the tailgate are pivoted between a closed vehicle bed orientation and an open vehicle bed orientation.

BRIEF DESCRIPTION OF THE DRAWINGS

The above and other objects and advantages of the disclosure will be apparent upon consideration of the following detailed description, taken in conjunction with the accompanying drawings, in which like reference characters refer to like parts throughout, and in which.

DETAILED DESCRIPTION

In one embodiment, the disclosure relates to a vehicle tailgate assembly that includes a sill flap and tailgate, where the sill flap has rollers that contact the tailgate while the sill flap and tailgate are opened or closed. The sill flap thus maintains rolling contact with the tailgate during opening and closing operations. In embodiments of the disclosure, the tailgate opens to leave a gap between the edge of the vehicle bed and the edge of the tailgate, where the sill flap is pivoted into this gap. While being pivoted into this open position, the sill flap rollers rotatably contact the tailgate, so that the sill flap maintains rolling contact with the tailgate rather than frictional contact therewith. This prevents damage to the sill flap and tailgate when opened and closed. Such configurations also allow for various sill flap shapes, including those with cutouts accommodating various vehicle bed shapes. In this manner, sill flaps may accommodate many different bed designs and shapes.

Configurations of embodiments of the disclosure thus provide a tailgate assembly in which both the tailgate and the sill flap open to a horizontal configuration, providing greater extension of the vehicle bed when opened. The sill flap may also have a cutout accommodating a portion of the tire bin when the tailgate assembly is closed, thus allowing the tire bin to extend beyond the tailgate when closed, and accordingly allowing more space to accommodate various vehicle components under the bed.

Figure 1:
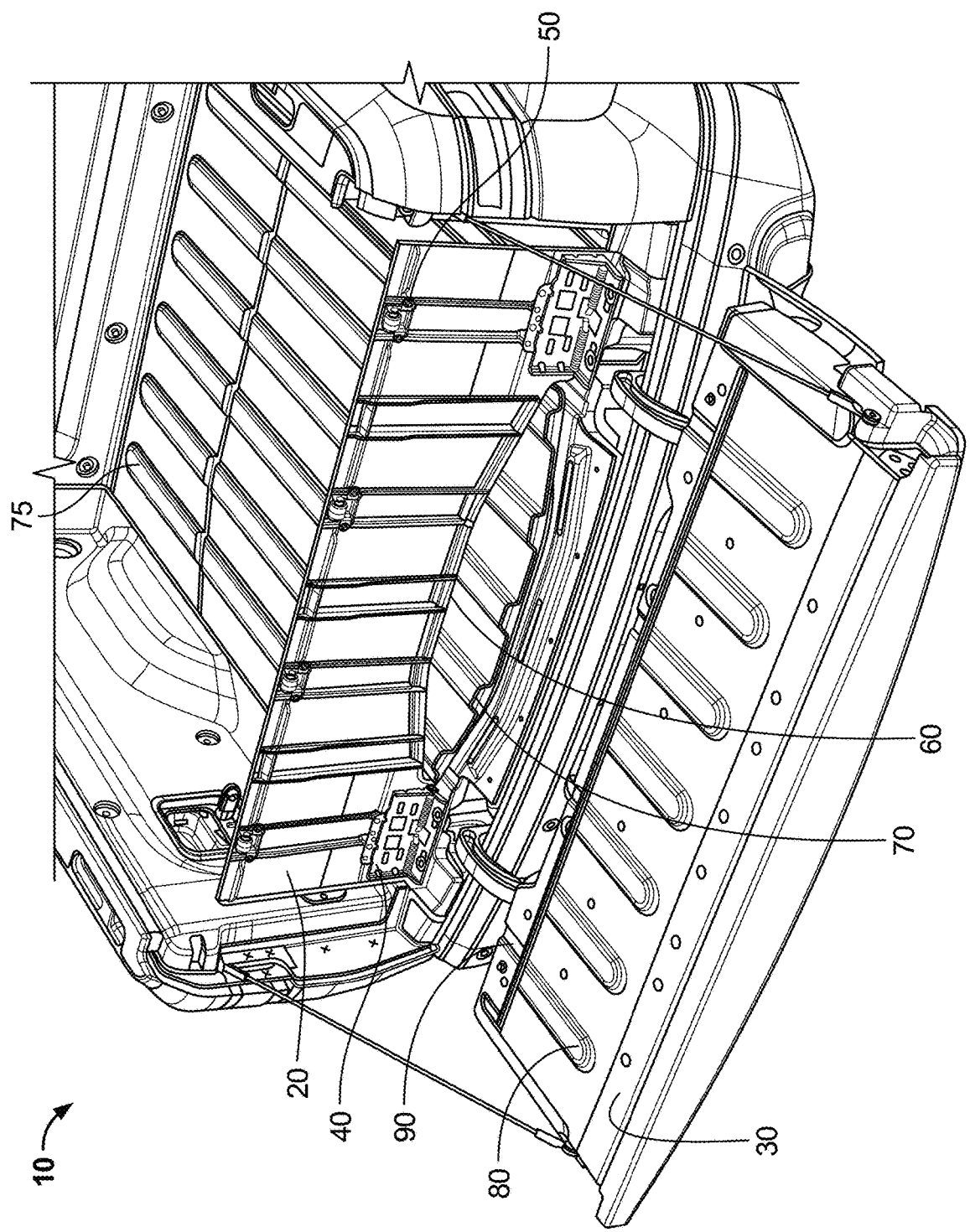
FIG. 1 is an isometric view of an electric vehicle bed and tailgate assembly constructed in accordance with some embodiments of the disclosure.

FIG. 1 is an isometric view of an electric vehicle bed and tailgate assembly constructed in accordance with some embodiments of the disclosure. Here, a vehicle tailgate assembly 10 includes a sill flap 20 shown in its closed configuration, and a tailgate 30 shown in its open configuration. The sill flap 20 and tailgate 30 are each pivotably affixed to the end 70 of a vehicle bed 75, as shown. The sill flap 20 is affixed to the vehicle bed 75 by hinges 40 at its bottom end. Thus, the sill flap 20 is oriented vertically in the view of FIG. 1 when the tailgate assembly 10 is closed, i.e., when the vehicle bed 75 is closed. The tailgate 30 is likewise oriented vertically when the tailgate assembly 10 is closed, so that the tailgate 30 and sill flap 20 are both arranged vertically and generally parallel to each other. When the tailgate assembly 10 is opened, i.e., when the vehicle bed 75 is open, the tailgate 30 lies flat or horizontal in the view of FIG. 1, and the sill flap 20 pivots upon its hinges 40 to lie flat between the end 70 of the vehicle bed 75 and the tailgate 30. In this manner, both the sill flap 20 and the tailgate 30, when in their open configuration, are positioned as extensions of the vehicle bed 75, serving as portions of the bed load floor surface and providing a larger vehicle bed area.

Rollers 50 are positioned at or near the upper edge of the sill flap 20 to face the tailgate 30 when the tailgate 30 and sill flap 20 are in their closed configuration. The surface of tailgate 30 facing the sill flap 20 (when both the sill flap 20 and tailgate 30 are in the closed configuration) has a number of raised channels 80 and recessed channels 90 formed therein and positioned to accept the rollers 50 when the sill flap 20 and tailgate 30 face each other. In this manner, when the tailgate assembly 10 is opened, both the sill flap 20 and tailgate 30 fold downward from their vertical orientation to their horizontal orientation, with the sill flap 20 lying against the tailgate 30 as both are pivoted into their horizontal orientations. To prevent frictional contact during opening, the sill flap 20 contacts the tailgate 30 at its rollers 50, with the rollers 50 rotatably moving along the raised channels 80 as the sill flap 20 moves relative to tailgate 30. As the tailgate assembly 10 is fully opened, rollers 50 are seated within recessed channels 90, where they are maintained while the tailgate 30 and sill flap 20 are in their fully open positions. In some embodiments, the lip of sill flap 20 rests on a recessed ledge of the tailgate 30 in their open positions. In some embodiments, the bottoms of rollers 50 are positioned within recessed channels 90, but do not make contact with the bottom of the recessed channels or do not bear significant weight when the sill flap 20 is in its open position. This way, the full amount or a significant amount of the weight of any objects resting on sill flap 20 is supported across the lip of the sill flap 20. In some embodiments, this provides a larger contact area for supporting the weight and prevents large forces on the rollers 50.

The sill flap 20 has a cutout 60 in its lower edge, proximate to the hinges 40, where this cutout 60 is shaped to accommodate the curved end 70 of the vehicle bed 75 when the sill flap 30 is folded down to its open configuration. In this manner, embodiments of the disclosure allow for larger vehicle beds whose ends 70 may protrude beyond the sill flap 20 when the sill flap 20 is closed, providing greater clearance for other vehicle components. For example, vehicles may be provided greater clearance for tire bins that must accommodate larger tires. As another example, electric vehicles may be provided greater clearance under their cargo beds to accommodate larger battery packs or other electrical components. Furthermore, various shapes of components such as spare tires can be accommodated, such as shown in FIG. 1 where a curved portion of the spare tire bin extends past sill flap 20, and cutout 60 is thus shaped to accommodate the curved spare tire bin.

Figure 2:
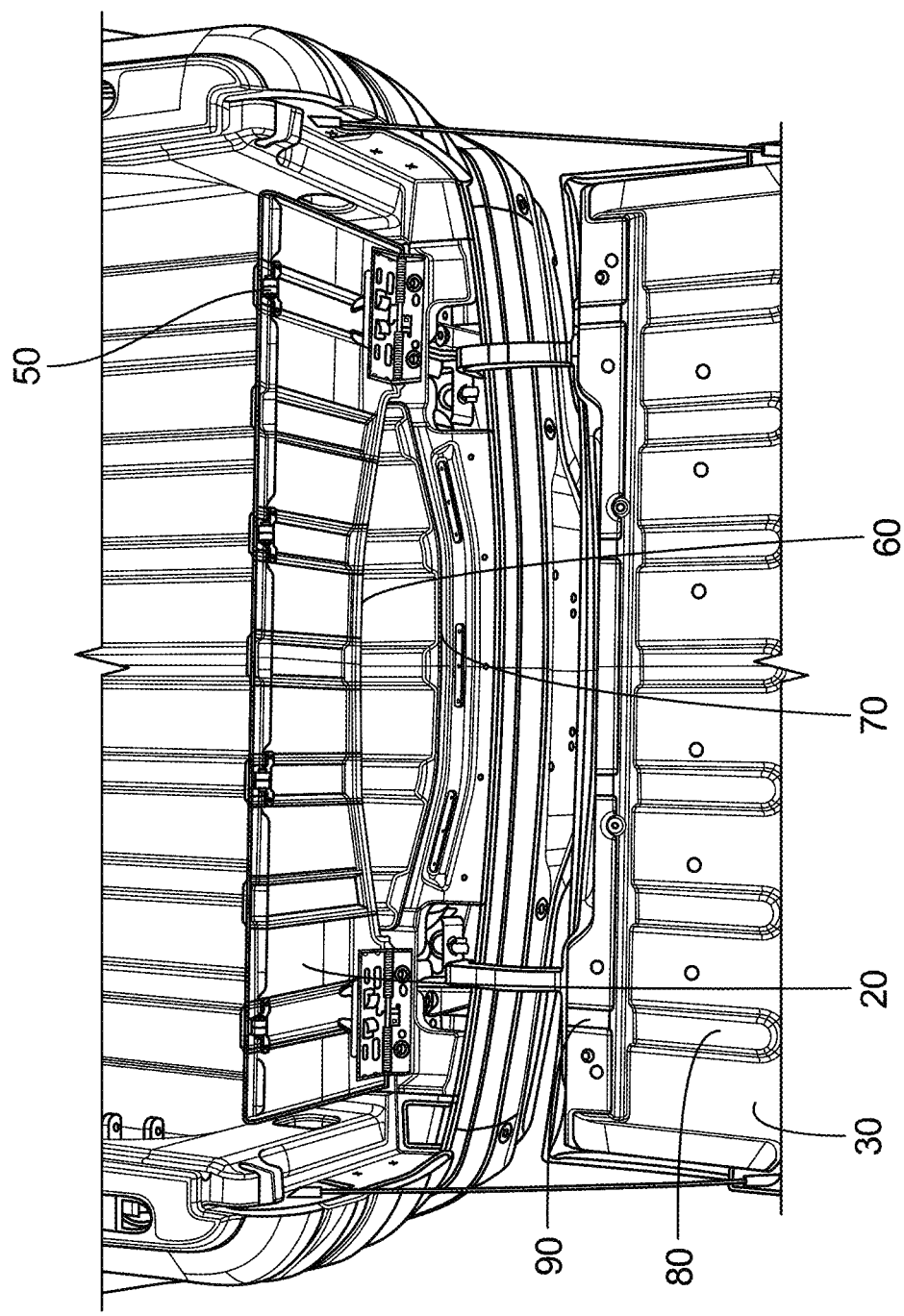
FIG. 2 is a top view illustrating further details of an electric vehicle bed and tailgate assembly constructed in accordance with some embodiments of the disclosure.

FIG. 2 is a top view illustrating further details of an electric vehicle bed and tailgate assembly constructed in accordance with some embodiments of the disclosure. As shown, each roller 50 of sill flap 20 is positioned to roll along a raised channel 80 when the sill flap 20 and tailgate 30 are opened, with the rollers 50 rolling from the raised channels 80 into recessed channels 90 when the sill flap 20 and tailgate 30 are placed in their fully open configuration. In this manner, when fully opened, the sill flap 20 lies horizontal, or substantially parallel to the upper surface of the vehicle bed 75, to be positioned between the end 70 of the vehicle bed 75 and the edge of the tailgate 30.

Figure 3:
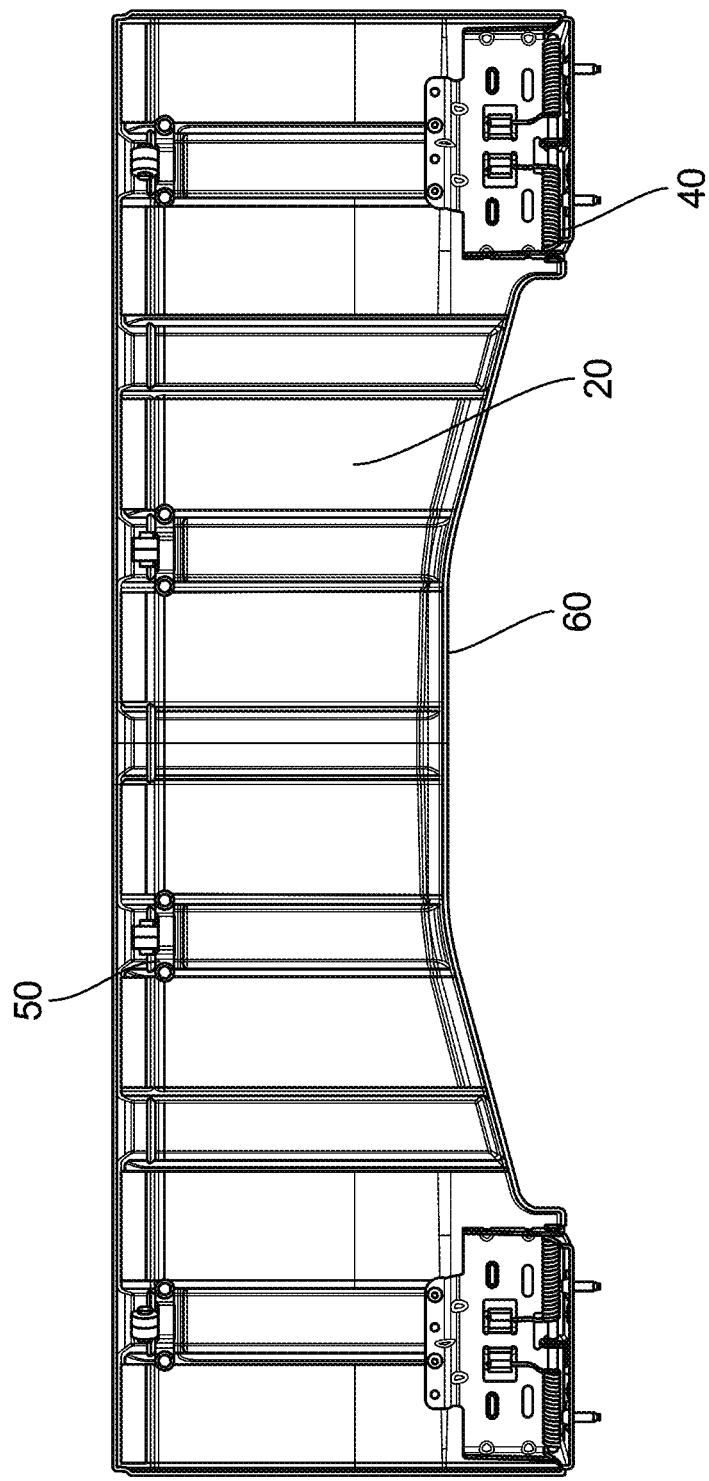
FIG. 3 is an isolation view of a sill flap of a tailgate assembly constructed in accordance with some embodiments of the disclosure.

FIG. 3 is an isolation view of a sill flap of a tailgate assembly constructed in accordance with some embodiments of the disclosure. In particular, FIG. 3 shows the surface of sill flap 20 that faces tailgate 30. As can be seen, sill flap 20 rotates about hinges 40 to pivot between closed and open configurations, with rollers 50 contacting the surface of tailgate 30 that faces sill flap 20, and more specifically contacting the raised channels 80 of tailgate 30. Any number of hinges 40 may be employed to pivotably connect the sill flap 20 to the vehicle bed 75. Furthermore, the cutout 60, while being shown as generally arcuate to correspond to the shape of the end 70 of the vehicle bed 75, may be of any suitable and desired shape.

Sill flap 20 and tailgate 30 may be constructed of any suitable material or materials. For example, sill flap 20 and tailgate 30 may each be made of steel, aluminum, an ultraviolet (UV) light resistant sheet molded compound (SMC), or any other material suitable for construction of a vehicle tailgate assembly.

Figure 4:
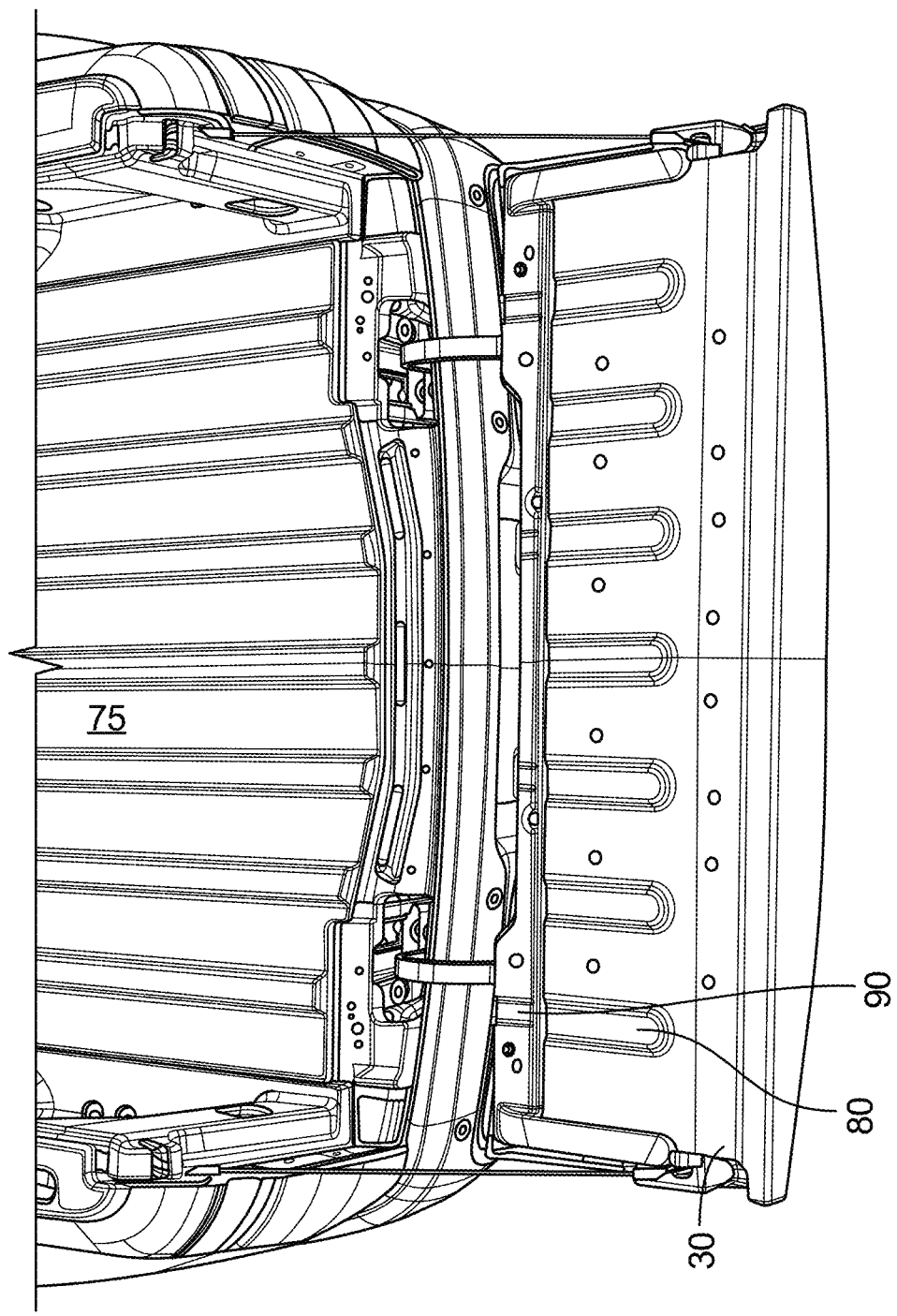
FIG. 4 is a view illustrating further details of a tailgate assembly constructed in accordance with some embodiments of the disclosure.

FIG. 4 is a view illustrating further details of a tailgate assembly constructed in accordance with some embodiments of the disclosure. As above, the tailgate 30 is shown in its opened configuration, positioned to lie horizontally or generally parallel to the upper surface of the vehicle bed 75. Sill flap 20 is not depicted in FIG. 4 so that the underlying structure is visible. When opened, the rollers 50 of sill flap 20 roll along raised channels 80 to land within recessed channels 90 when the tailgate assembly 10 is fully opened.

Figure 5:
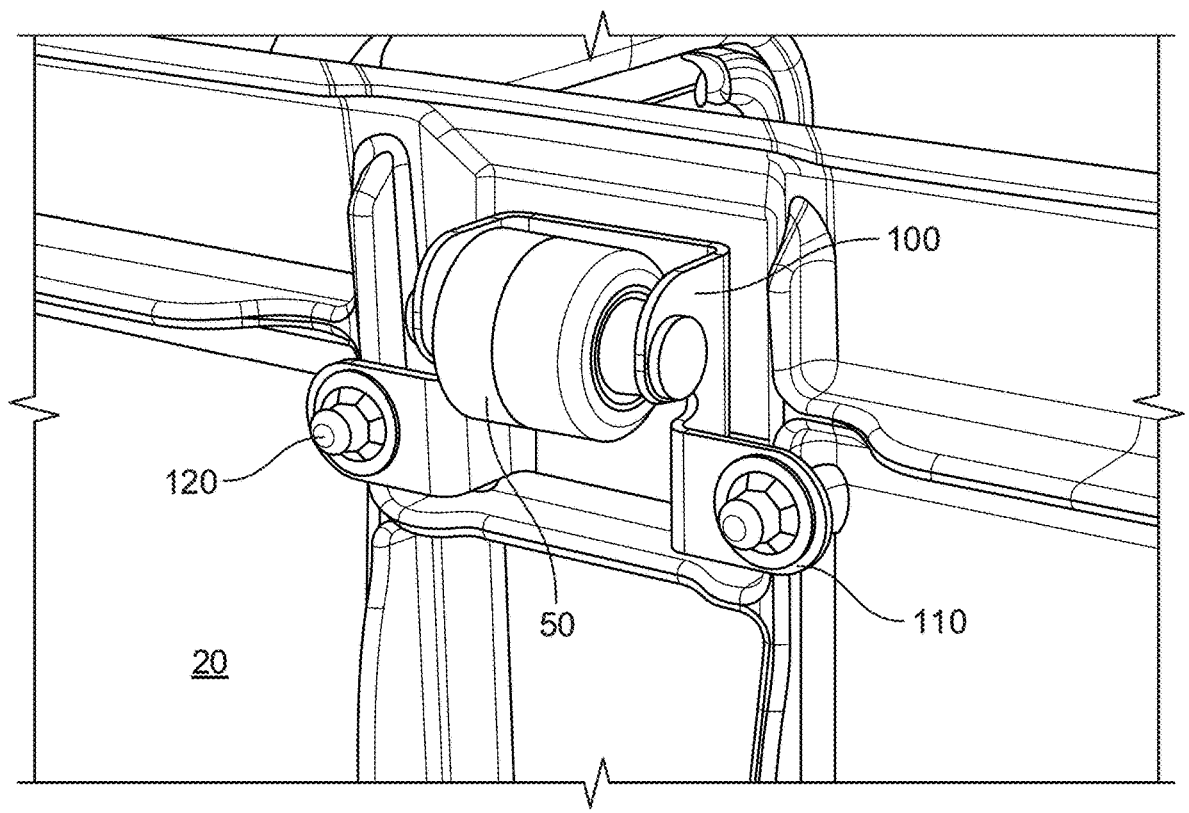
FIG. 5 is an isometric view illustrating further details of sill flap rollers in accordance with some embodiments of the disclosure.

FIG. 5 is an isometric view illustrating further details of the sill flap rollers 50 in accordance with some embodiments of the disclosure. The rollers 50 may be any rotatable elements suitable for maintaining rolling contact with tailgate 30. In some embodiments, each roller 50 is rotatably affixed to a bracket 100 for attachment to sill flap 20. In particular, bracket 110 has any number of flanges 110 extending therefrom and having holes or other features accommodating fasteners 120 that rigidly affix brackets 110 to corresponding features (e.g., holes, flanges, or the like) of sill flap 20. The fasteners 120 may be any fasteners suitable for rigidly affixing brackets 100 and rollers 50 to sill flap 20, such as screws, bolts, rivets, or the like. In this manner, rollers 50 are rotatably coupled to the sill flap 20 and positioned to face the tailgate 30 so as to roll on raised channels 80 and drop within recessed channels 90 when the tailgate assembly 10 is opened or closed.

The brackets 100 and flanges 110 may be made of any material suitable for rigidly affixing one or more components of rollers 50 to a sill flap 20, such as a steel, an aluminum, SMC, or the like. Furthermore, rollers 50 may be made of any material suitable for allowing rolling contact with tailgate 30 without excessive wear on either rollers 50 or tailgate 30. For example, rollers 50 may be made of a plastic such as a polyurethane, a metal such a steel or an aluminum, or any other suitable material.

Figure 6:
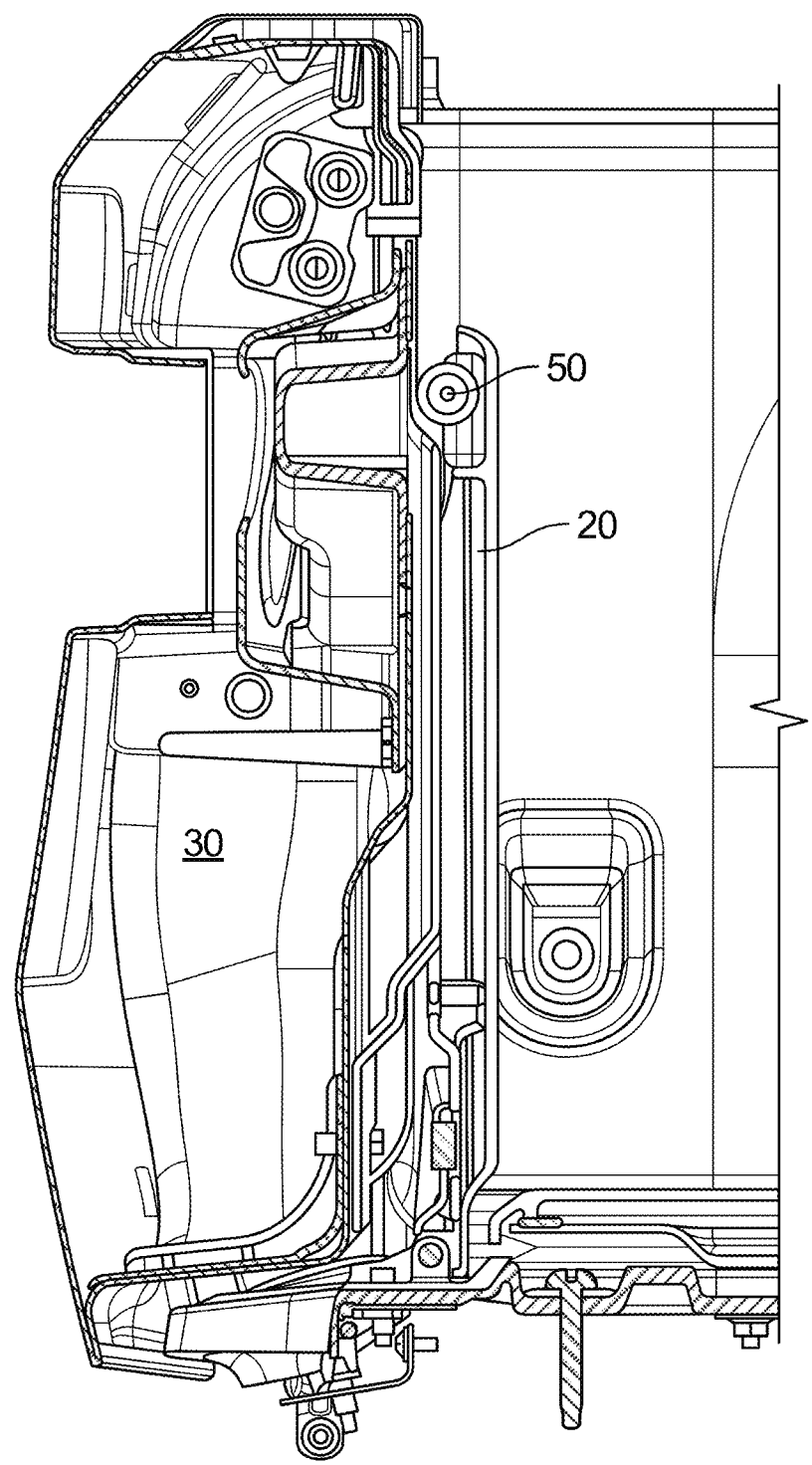
FIG. 6 is a cutaway side view of a tailgate assembly constructed in accordance with some embodiments of the disclosure.

FIG. 6 is a cutaway side view of a tailgate assembly constructed in accordance with some embodiments of the disclosure. More specifically, FIG. 6 illustrates the closed configuration of sill flap 20 and tailgate 30. Here, sill flap 20 and tailgate 30 are closed, each oriented substantially vertically with respect to the vehicle bed 75 and positioned generally parallel to each other. In some embodiments, in the closed configuration, sill flap 20 and tailgate 30 are in contact with each other, with rollers 50 lying on the upper portions of the raised channels 80. The tailgate 30 may have any cross-sectional structure, such as the structure shown in FIG. 6. In some embodiments, in the closed configuration, sill flap 20 and tailgate 30 are in contact with each other, with rollers 50 positioned beyond the ends of raised channels 80. In this configuration, sill flap 20 and tailgate 30 may achieve closer positioning with respect to each other in the closed configuration. In addition, in this configuration, the contact area between the sill flap 20 and the tailgate 30 may be increased, which provides a larger contact area for supporting lateral forces. Transition from the closed configuration of FIG. 6 to the open configuration is further described below in connection with FIGS. 8-9.

Figure 7:
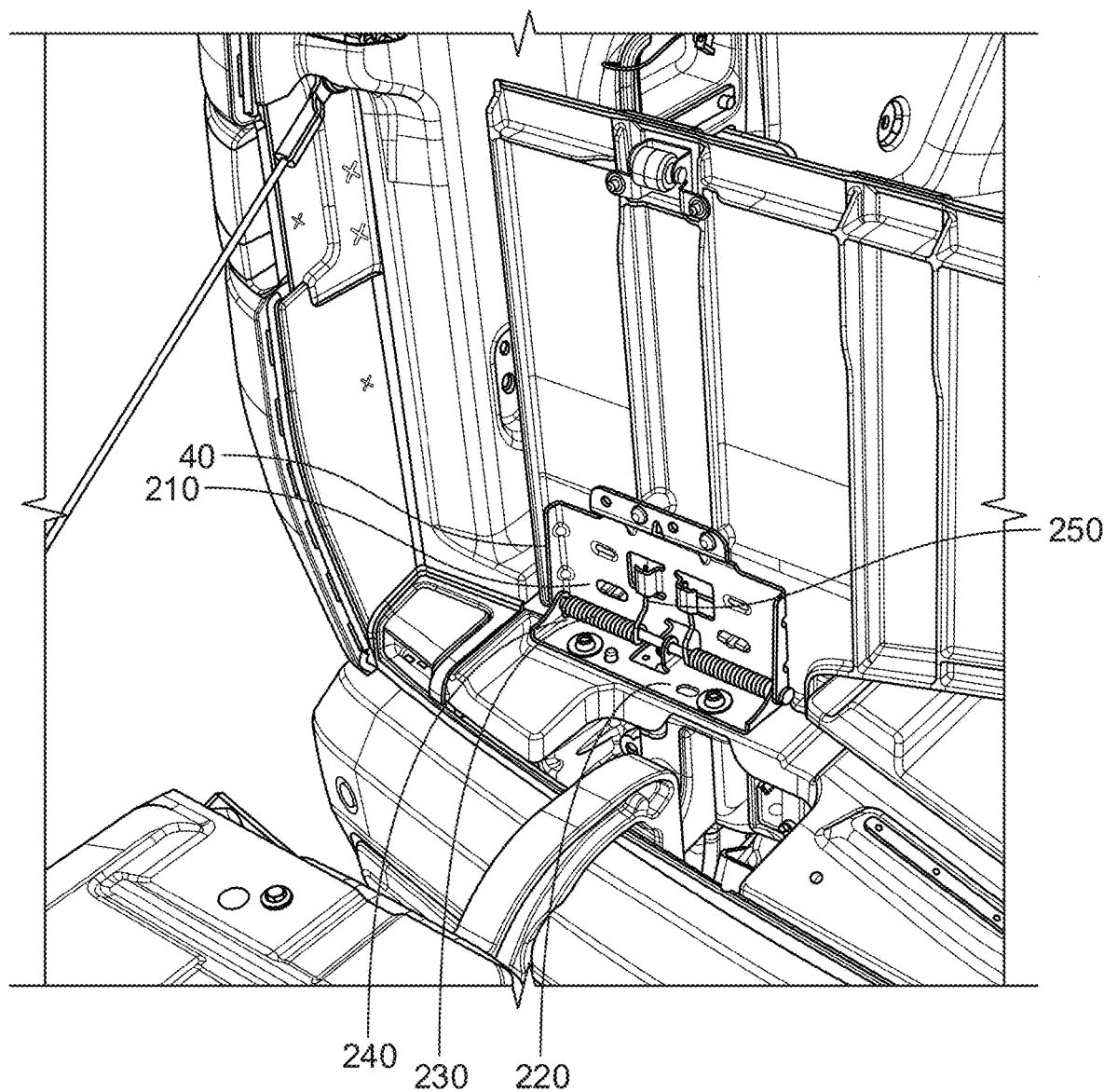
FIG. 7 is an isometric view illustrating further details of a sill flap hinge assembly constructed in accordance with some embodiments of the disclosure.

FIG. 7 is an isometric view illustrating further details of a sill flap hinge assembly constructed in accordance with some embodiments of the disclosure. As above, each hinge 40 allows sill flap 20 to pivot between its closed or vertical configuration and its open or horizontal configuration. Each hinge 40 may include a first panel 210 affixed to sill flap 20, a second panel 220 affixed to the vehicle bed 75, and a torsion spring 230 with a first end 240 and an opposing second end 250. The first panel 210 and second panel 220 are connected in any rigid manner to sill flap 20 and the vehicle bed 75 respectively. For example, each may be connected by any fasteners, adhesives, snap fit joints, or the like. Similarly, the ends 240, 250 of each torsion spring may be connected in any rigid manner to first panel 210 and second panel 220 respectively. For instance, ends 240, 250 may be connected to panels 210, 220 by any welding or soldering, by inserting or pressing ends 240, 250 into corresponding features of panels 210, 220, or the like. In operation, the torsion spring 230 of each hinge 40 is placed in torsion when the sill flap 20 is closed, providing a force that acts to press the sill flap 20 against the tailgate 30 in the closed configuration and during opening and closing of the sill flap 20 and tailgate 30.

Figure 8:
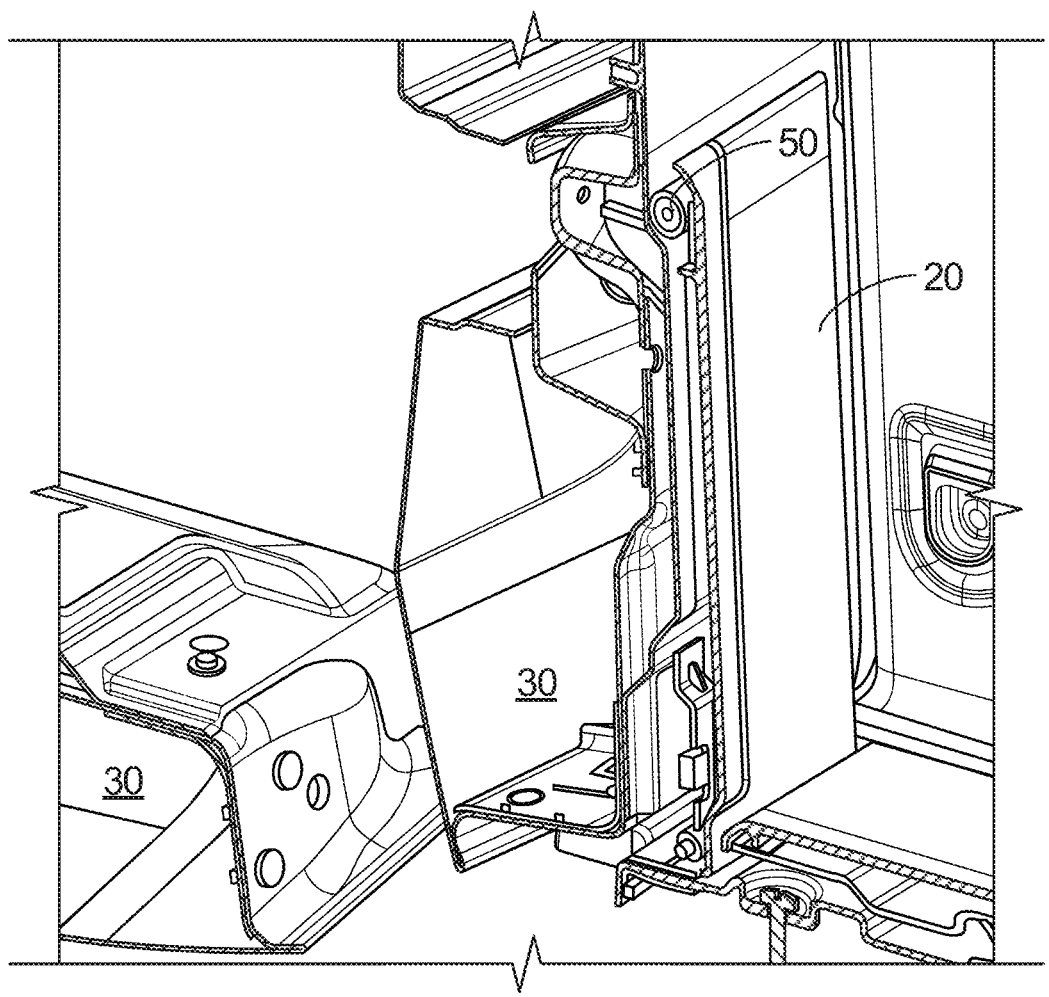
FIG. 8 is an isometric cutaway view illustrating further details of open and closed configurations of a tailgate assembly constructed in accordance with some embodiments of the disclosure.
Figure 9:
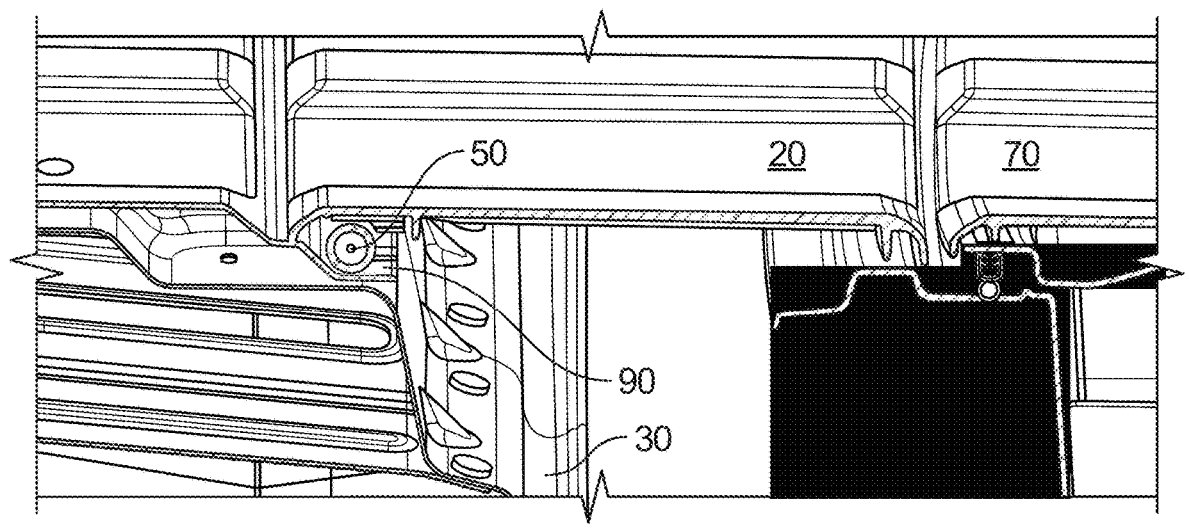
FIG. 9 is a cutaway view illustrating further details of contact between sill flap rollers and a tailgate, in accordance with some embodiments of the disclosure.

Movement of the tailgate assembly 10 from its closed configuration to its open configuration is now described in further detail in conjunction with FIGS. 8-9. FIG. 8 is an isometric cutaway view illustrating further details of open and closed configurations of a tailgate assembly 10 constructed in accordance with some embodiments of the disclosure, and FIG. 9 is a cutaway view illustrating further details of contact between the sill flap rollers 50 and tailgate 30, in accordance with some embodiments of the disclosure. As can be seen in the view of FIG. 8, when the sill flap 20 and tailgate 30 are closed, they are each oriented substantially vertically with respect to the vehicle bed 75, with the sill flap 20 positioned against the surface of tailgate 30 so that rollers 50 may contact tailgate 30. In some embodiments, rollers 50 are the only components of sill flap 20 to contact tailgate 30, however, this need not necessarily be the case in the closed configuration (e.g., in the configuration where the rollers 50 are positioned beyond the ends of raised channels 80).

The sill flap 20 and tailgate 30 may then be opened. When opened, tailgate 30 pivots outward and away from the edge 70 of the vehicle bed 75 as shown in the leftmost portion of FIG. 8 and in FIG. 9, such as via one or more gooseneck hinges or other wide-throw or swing-clear hinges. In this position, a gap or space is formed between the tailgate 30 and the edge 70 of the vehicle bed 75. The sill flap 20 pivots downward into this gap, to be placed between the tailgate 30 and edge 70 as shown in FIG. 9. When the sill flap 20 and tailgate 30 are moved from their closed to their open configurations, the sill flap 20 may be maintained against the tailgate 30 so that rollers 50 contact the tailgate 30. When such contact is maintained, the rollers 50 rotatably contact the raised channels 80 of tailgate 30 to roll along raised channels 80 and into recessed channels 90, where they may be maintained while the sill flap 20 and tailgate 30 are in their fully open configuration. In some embodiments, rollers 50 are the only points of contact between sill flap 20 and tailgate 30 when the tailgate assembly 10 is moved between its closed and open configurations. Accordingly, rollers 50 prevent sliding friction between the sill flap 20 and tailgate 30, instead allowing for rotational contact between the two. This prevents friction and thus excessive wear on the tailgate assembly 10. While rollers 50 are shown as being in contact with the recessed channels 90 of tailgate 30 when the sill flap 20 and tailgate 30 are in their fully open configuration, this need not necessarily be the case, and embodiments of the disclosure contemplate configurations in which the rollers 50 do not maintain contact with the recessed channels 90 when the tailgate 30 and sill flap 20 are fully open. That is, in some embodiments, the rollers 50 may for example be sized and positioned to lose contact with the upper surface of tailgate 30 when they roll off the end of raised channels 80 and over (or into) recessed channels 90. Recessed channels 90 may also have a depth greater than the diameter of rollers 50, so that rollers 50 do not contact channels 90 when the lip of sill flap 20 is in contact with the ledge of tailgate 30. In such embodiments, the upper edge of sill flap 20 may be the only contact between the sill flap 20 and tailgate 30 in the fully open position.

It is also noted that, in some embodiments of the disclosure, tailgate 30 may be formed with a ledge or flat area between the ends of raised channels 80 and recessed channels 90, to provide an area or line of contact with the lip of sill flap 20 when the tailgate 30 and sill flap 20 are fully opened. As above, this provides a support for sill flap 20 to rest upon, preventing excessive stresses and damage to sill flap 20 when loads are placed thereon. Additionally, the ends of raised channels 80 and recessed channels 90 may have any slope or angle, to provide a more gradual path for rollers 50 as they are rolled between raised channels 80 and recessed channels 90. This in turn prevents damage to rollers 50 and tailgate 30 during opening and closing operations.

Figure 10:
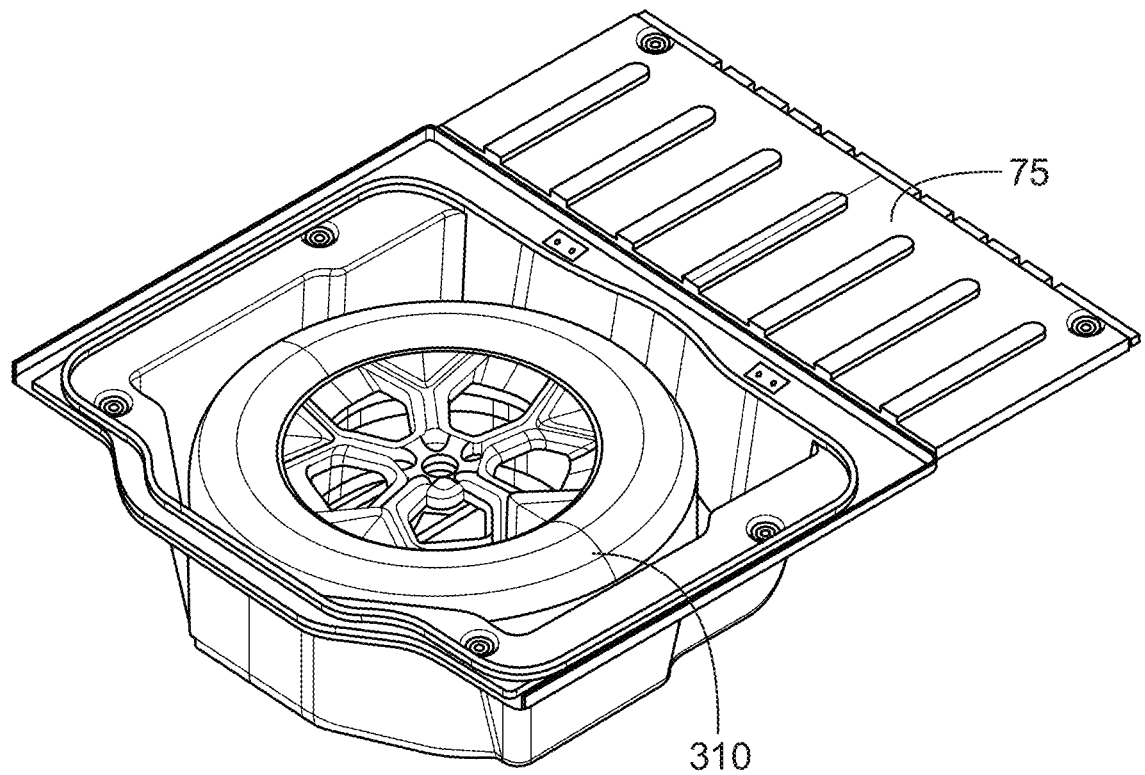
FIG. 10 is an isometric view of a vehicle bed spare tire bin and spare tire in accordance with some embodiments of the disclosure.
Figure 11:
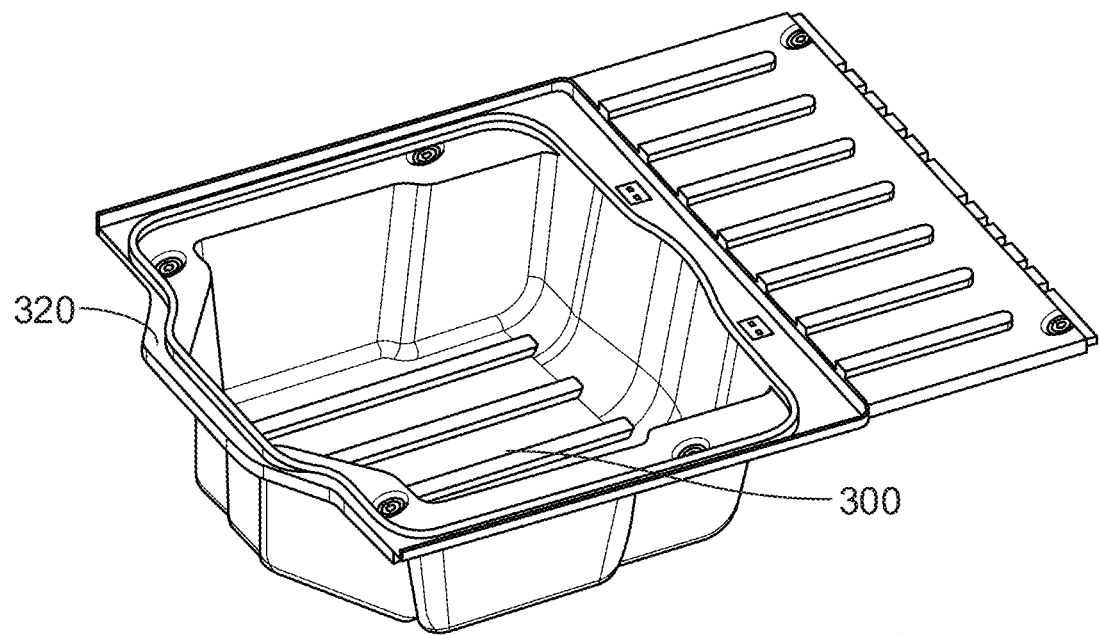
FIG. 11 is an isometric view illustrating further details of the spare tire bin of FIG. 10.

FIG. 10 is an isometric view of a vehicle bed spare tire bin and spare tire in accordance with some embodiments of the disclosure, and FIG. 11 is an isometric view illustrating further details of the spare tire bin of FIG. 10. In particular, the vehicle bed 75 may include a spare tire bin 300 sized and shaped to store a spare tire 310 within, with a curved edge 320 for accommodating the shape of spare tire 310. In some embodiments of the disclosure, it may be desirable for a portion of the spare tire bin 300 to extend beyond the sill flap 20 in the closed position, providing increased space or clearance within the vehicle. This in turn allows embodiments of the disclosure more space under vehicle beds, to accommodate various components. For instance, this allows electric vehicles to accommodate larger battery packs or components under their vehicle beds.

Embodiments of the disclosure contemplate sill flap 20 configurations that may be different from those shown above. As one example, cutouts 60 may be of any size, shape, and number suitable for accommodating any shape and configuration of edges 70. As another example, sill flap 20 may have any number of hinges 40 located at any positions along sill flap 20. The hinges 40 may have any configuration allowing for pivotable attachment to vehicle bed 75, using any mechanism besides a torsion spring, such as a shock and/or damper, a flexible member for absorbing rotational energy of the sill flap 20, or the like.

The foregoing description, for purposes of explanation, used specific nomenclature to provide a thorough understanding of the disclosure. However, it will be apparent to one skilled in the art that the specific details are not required to practice the methods and systems of the disclosure. Thus, the foregoing descriptions of specific embodiments of the present disclosure are presented for purposes of illustration and description. They are not intended to be exhaustive or to limit the invention to the precise forms disclosed. Many modifications and variations are possible in view of the above teachings. For example, sill flaps of embodiments of the disclosure may have any cutout of any shape, to accommodate ends of vehicle beds that are shaped in any manner. Sill flaps of embodiments of the disclosure may also have any number of rollers 50 for contact with tailgate 30, and tailgate 30 may have any corresponding number of channels for accommodating the rollers 50. The embodiments were chosen and described in order to best explain the principles of the disclosure and its practical applications, to thereby enable others skilled in the art to best utilize the methods and systems of the disclosure and various embodiments with various modifications as are suited to the particular use contemplated. Additionally, different features of the various embodiments, disclosed or otherwise, can be mixed and matched or otherwise combined so as to create further embodiments contemplated by the disclosure. All dimensional values are approximate, and may vary.

What is claimed is:

1. A sill flap, comprising:
   a first end for connection to a vehicle;
   a second end opposite the first end;
   an upper surface; and
   one or more rollers rotatably coupled to the second end, wherein:
      the sill flap is configured to pivot between a closed configuration in which the sill flap is oriented substantially parallel to a vehicle panel with the one or more rollers positioned between the sill flap and the vehicle panel and an open configuration in which the upper surface of the sill flap is oriented substantially parallel to an upper surface of the vehicle panel.

2. The sill flap of claim 1, wherein in the open configuration, at least a portion of the sill flap is positioned upon the vehicle panel.

3. The sill flap of claim 1, wherein in the open configuration, the sill flap is positioned between a floor surface of the vehicle and the vehicle panel.

4. The sill flap of claim 1, wherein:
   the vehicle panel is configured to pivot between a closed configuration and an open configuration; and
   the one or more rollers are coupled to the sill flap so as to be maintained in rotatable contact with the vehicle panel while the sill flap and vehicle panel are pivoted between their closed configurations and open configurations.

5. The sill flap of claim 4, wherein the vehicle panel has one or more raised channels, and wherein the one or more rollers are positioned on corresponding ones of the raised channels to rotatably contact the raised channels while the sill flap and the vehicle panel are pivoted between their closed configurations and open configurations.

6. The sill flap of claim 1, wherein the first end of the sill flap has a connection portion configured for connection to the vehicle, and a cutout shaped to accommodate a portion of the vehicle when the sill flap is in the open configuration.

7. The sill flap of claim 6, wherein the sill flap has a first width along the connection portion and a second width along the cutout, the first width being greater than the second width.

8. The sill flap of claim 6, wherein a portion of the vehicle extends beyond the connection portion of the sill flap when the sill flap is in the closed configuration.

9. The sill flap of claim 8, wherein the portion of the vehicle is shaped to accommodate a vehicle tire.

10. The sill flap of claim 1, further comprising a hinge affixed to the first end of the sill flap and configured for pivotable connection to the vehicle, wherein the hinge comprises a torsion spring having a first end for coupling to the vehicle and an opposing second end for coupling to the sill flap, so as to undergo torsion when the sill flap is pivoted from the closed configuration to the open configuration.

11. The sill flap of claim 1, wherein the vehicle panel comprises one or more recessed channels each shaped to receive a corresponding one of the rollers when the sill flap is in the open configuration.

12. The sill flap of claim 11, wherein:
   the vehicle panel further comprises a recessed ledge between the one or more recessed channels and one or more recessed channels;
   the sill flap comprises a lip at the second end; and the lip of the sill flap rests on the recessed ledge when the sill flap is in the open configuration.

13. The sill flap of claim 1, wherein the one or more rollers are positioned above a portion of the vehicle panel when the sill flap is in the open configuration.

14. A vehicle comprising:
a floor surface; and
a sill flap and a vehicle panel each pivotably connected to the floor surface, the sill flap having one or more rollers facing the vehicle panel and positioned to rotatably contact the vehicle panel as the sill flap and the vehicle panel are pivoted between a closed orientation and an open orientation.

15. The vehicle of claim 14, wherein in the open orientation the sill flap is positioned between the floor surface and the vehicle panel.

16. The vehicle of claim 15, wherein:
the vehicle panel comprises one or more raised channels and one or more recessed channels;
the one or more rollers are positioned on corresponding ones of the raised channels to rotatably contact the raised channels when the sill flap and the vehicle panel are pivoted between the closed orientation and the open orientation; and
each of the one or more recessed channels are shaped to receive a corresponding one of the rollers when the sill flap and the vehicle panel are in the open orientation.

17. The vehicle of claim 14, wherein the sill flap has a connection portion connected to the floor surface, and a cutout shaped to accommodate a portion of the floor surface when the sill flap is in the open orientation.

18. The vehicle of claim 17, wherein a portion of the floor surface extends beyond the connection portion of the sill flap when the sill flap is in the closed orientation.

19. The vehicle of claim 18, wherein the portion of the floor surface is shaped to accommodate a vehicle tire.

20. The vehicle of claim 14, further comprising a hinge affixed to the sill flap and configured for pivotable connection to the floor surface, the hinge comprising a torsion spring having a first end coupled to the floor surface and an opposing second end coupled to the sill flap.

* * * * *